United States Patent
Ambli

(10) Patent No.: US 12,140,204 B1
(45) Date of Patent: Nov. 12, 2024

(54) SHACKLE ADAPTER

(71) Applicant: Fredrick George Ambli, Bluffton, SC (US)

(72) Inventor: Fredrick George Ambli, Bluffton, SC (US)

( * ) Notice: Subject to any disclaimer, the term of this patent is extended or adjusted under 35 U.S.C. 154(b) by 0 days.

(21) Appl. No.: 18/441,326

(22) Filed: Feb. 14, 2024

(51) Int. Cl.
*F16G 15/06* (2006.01)

(52) U.S. Cl.
CPC .................................... *F16G 15/06* (2013.01)

(58) Field of Classification Search
CPC .................................. F16G 15/04; F16G 15/06
See application file for complete search history.

(56) References Cited

U.S. PATENT DOCUMENTS 5,769,475 A * 6/1998 Tylaska .................. F16G 15/04
24/601.5

2017/0089382 A1 * 3/2017 VerBrugge ............ F16B 21/186

* cited by examiner

*Primary Examiner* — Mohammed S. Alawadi
(74) *Attorney, Agent, or Firm* — Johnson and Phung; Thomas N. Phung

(57) ABSTRACT

A shackle adapter having an main body with a first side, a second side, and a curved support surface engageable to a curved surface of an inner arc contour of a bow portion of a bow-type shackle, a first arm located proximal the first side of the main body and having an inner surface engageable with a first side of the bow portion, a second arm located proximal the second side of the main body and having an inner surface engageable with a second side of the bow portion with the arms extending from the main body in a direction parallel to the sides of the main body, a first retaining member located on the inner surface of the first arm and a corresponding second retaining member located on the inner surface of the second arm, the retaining members assisting in securing the main body to the bow-type shackle.

15 Claims, 2 Drawing Sheets

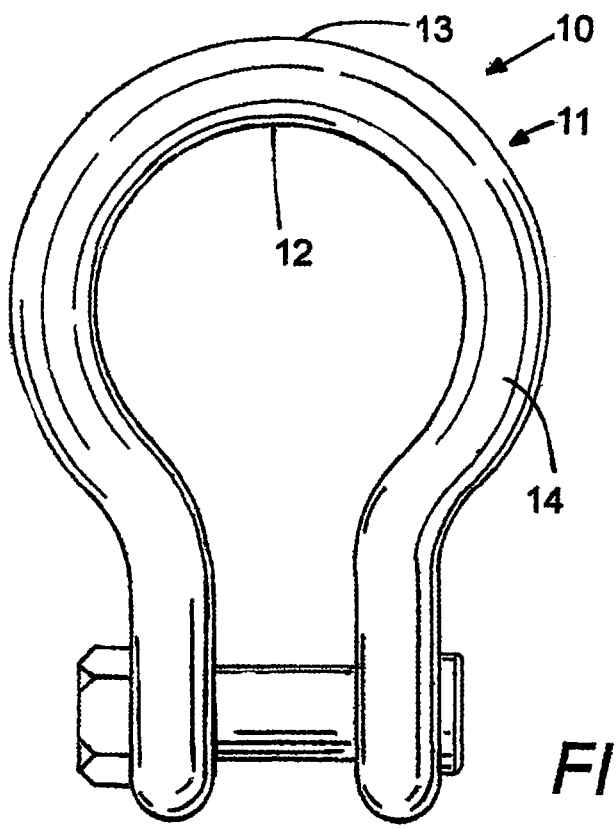
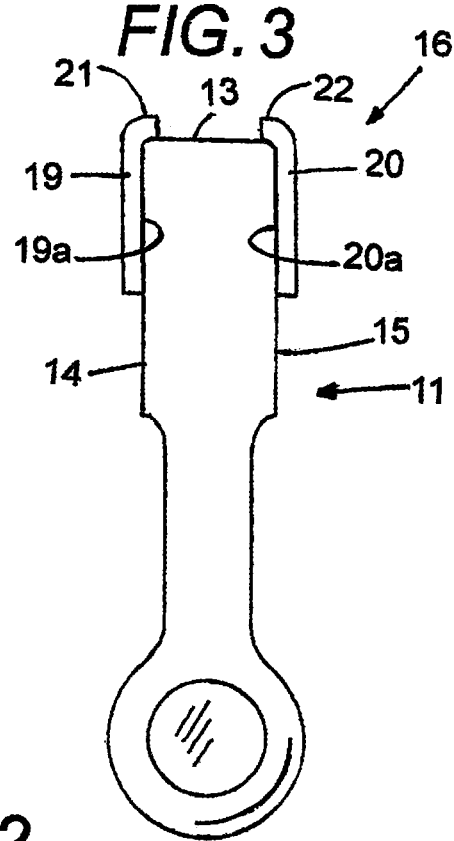
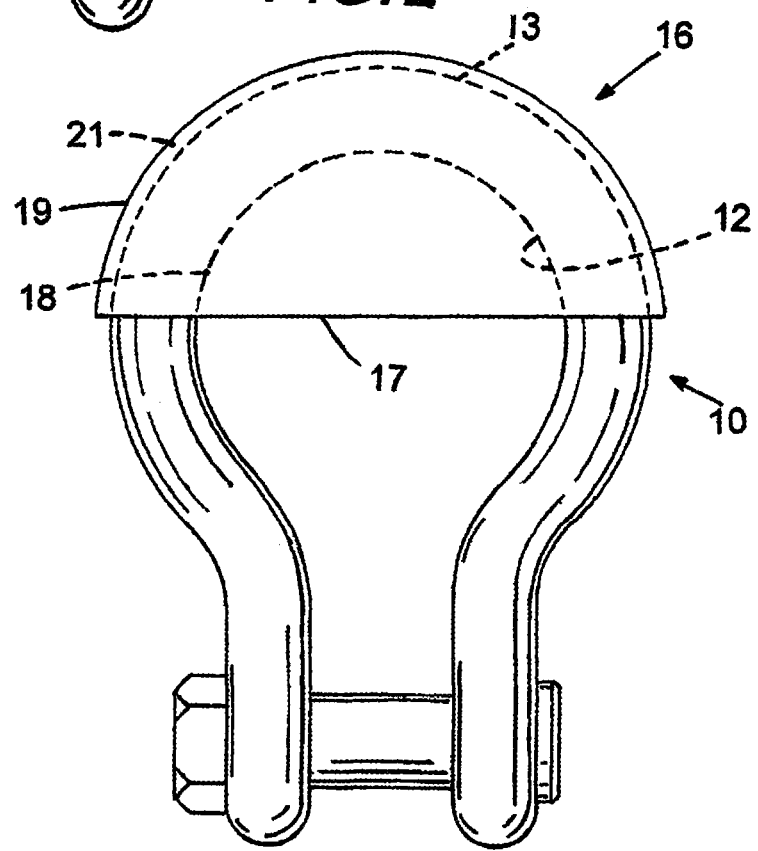

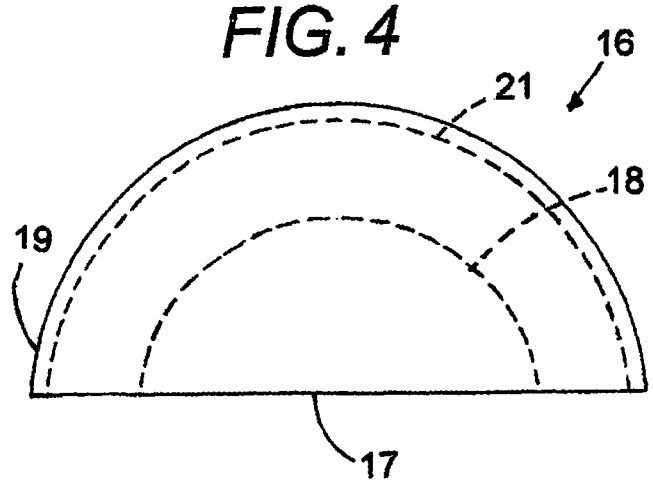
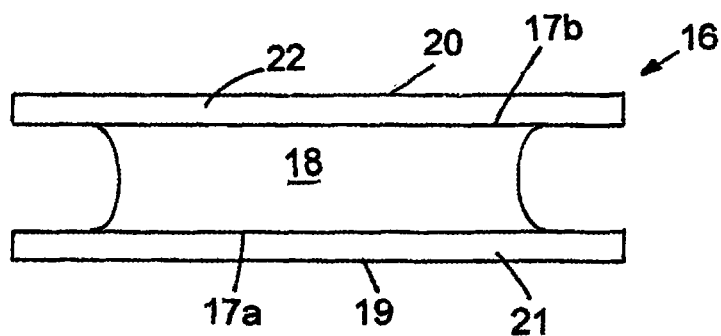
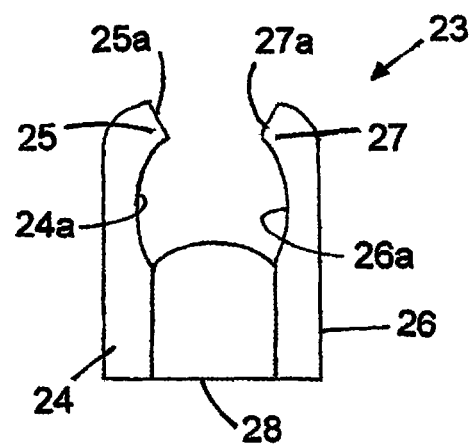
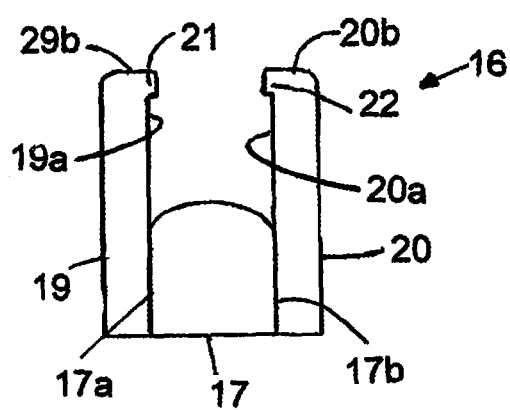

SHACKLE ADAPTER

FIELD OF THE INVENTION

This invention relates generally to heavy duty shackle and, more specifically to a shackle adaptor attachable to a bow surface of a bow type shackle to provide the bow type shackle with the same efficiency and design factor as that of flat web shackles.

CROSS-REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

There are hundreds of thousands if not millions of shackles that were built to handle wire rope. Many of these shackles are commonly referred to as anchor shackles and include a bow shape to allow the rope attached thereto to center itself on the top of the shackle.

These shackles have been developed and improved upon since the 1600's but still maintain their bow shape configuration.

Synthetic slings shackles such as flat web shackles were developed in the 1950's. Round-shaped slings were developed in the 1960's. Synthetic slings shackles initially were developed only with polyester fibers, but they can now be found to be fabricated with many different fibers.

When comparing the use of flat web and round slings to the bow type shackle, the bow type shackle imposes a 20% loss in the sling's efficiency. More specifically, it is known that slings that are used or tested on a flat surface shackle versus a curved surface of the bow type shackle retain their 5 to 1 design factor.

There thus is a need for a device that can convert the numerous anchor shackles or bow type shackle to the flat web shackle to obtain the 5 to 1 design factor of the flat web shackle.

SUMMARY OF THE INVENTION

Briefly, the present invention comprises a shackle adapter that includes an adapter main body preferably made from a hardened rubber or plastic with the adapter main body having a first side, a second side, and a curved support surface engageable to a curved surface of an inner arc contour of a bow portion of a bow-type shackle with the curved support surface of the adapter main body conforming to the curved surface of the inner arc contour of the bow portion of a bow-type shackle.

Located proximal to the first side of the main body is a first arm extending from the main body in a direction parallel to or within 10 degrees from the sides of the main body. The first arm includes an inner surface engageable with a first side of the bow portion of the bow-type shackle. Located proximal the second side of the main body is a second arm extending from the main body in a direction parallel to or within 10 degrees from the sides of the main body. The second arm includes an inner surface engageable with a second side of the bow portion of bow-type shackle with the arms each providing an outward flexing action for attachment to the bow portion of the bow-type shackle.

Located on the inner surface proximal a free end of the first arm is a first retaining member and located on the inner surface proximal a free end of the second arm is a corresponding second retaining member with the retaining members cooperating by each engaging an outer surface of the bow portion to assist in securing the adapter main body to the bow portion of the bow-type shackle wherein the adapter main body enabling a bow-type shackle, when use with a synthetic sling, to retain the 5 to 1 design factor and up to a 5-degree offset in a straight-line pull compared to the use of the bow-type shackle alone.

BRIEF DESCRIPTION OF THE DRAWINGS

FIG. 1 is a front view of a typical bow-type shackle that generally includes a bow portion having an inner arc contour;

FIG. 2 is a front view of a shack adapter attached to the bow portion of the bow-type shackle of FIG. 1;

FIG. 3 is an end view of the shack adapter and bow-type shackle of FIG. 2;

FIG. 4 is a side view of the shack adapter of FIGS. 2 and 3;

FIG. 5 is a top view of the shack adapter of FIG. 4;

FIG. 6 is an end view of the shack adapter of FIG. 4; and

FIG. 7 is an end view of an alternative embodiment of a shack adapter.

DESCRIPTION OF THE PREFERRED EMBODIMENT

The general purpose of the present invention, which will be described subsequently in greater detail, is to provide a shackle adaptor attachable to a bow surface of a bow type shackle to provide the bow type shackle with the same efficiency and design factor as that of flat web shackles.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring to the drawings, FIG. 1 is a front view of a typical bow-type shackle 10, which generally includes a bow portion 11 having an inner arc contour surface 12, a top outer surface 13, a first side 14 and a second side 15. FIG. 2 is a front view and FIG. 3 is an end view showing an embodiment of a shack adapter 16 of the present invention attached to the bow portion 11 of the bow-type shackle 10 of FIG. 1. FIG. 4 is a stand-alone side view, FIG. 5 is a stand-alone top view, and FIG. 6 is a stand-alone end view of the shack adapter 16 of FIGS. 2 and 3.

As shown in FIGS. 2-6, the shackle adapter 16 generally includes an adapter main body 17 preferably having a crescent or half-moon shape and includes a first side 17a, a second side 17b, and a curved support surface 18 engageable to the inner arc contour surface 12 of the bow portion 11 of the bow-type shackle 10 of FIG. 1 with the curved support surface 18 of the shackle adapter 16 conforming to the curved surface of the inner arc contour of the bow portion of a bow-type shackle. Although the shackle adapter 16 may be made from a variety of materials including but not limited to metal and metal alloys, the shackle adapter 16 is preferably made from a weather resistant hardened rubber or plastic.

Located proximal the first side 17a of the adapter main body 17 is a first arm 19 that extends from the adapter main body 17 in a direction parallel to the sides 17a, 17b of the adapter main body 17. The first arm 19 includes an inner surface 19a engageable with the first side 14 of the bow portion 11 of the bow-type shackle 10. Located proximal the second side 17b of the adapter main body 17 is a second arm 20 that extends from the adapter main body 17 in a direction parallel to the sides 17a, 17b of the adapter main body 17. The second arm 20 also includes an inner surface 20a engageable with the second side 15 of the bow portion 11 of the bow-type shackle 10.

Although the first and second arms 19 and 20 may be made from a variety of materials, in the embodiment of FIGS. 2-6, the arms 19 and 20 are made from a semi-rigid material to enable their flexing for enhancing the attachment of the shackle adapter 16 to the bow portion 11 of the bow-type shackle 10.

Although the first arm 19 is shown extending from the first side 17a of the main body 17 in a direction parallel to the sides 17a, 17b of the adapter main body 17 and the second arm 20 is shown extending from the second side 17b of the adapter main body 17 in a direction parallel to the sides 17a, 17b of the adapter main body 17, alternative embodiments of the present invention may include the first and second arms each extending from the curved support surface 18 of the adapter main body 17 in a direction parallel to the sides 17a, 17b of the adapter main body 17.

Located on the inner surface 19a proximal a free end 19b of the first arm 19 is a first retaining member 21 and located on the inner surface 20a proximal a free end 20b of the second arm 20 is a corresponding second retaining member 22. The retaining members 21, 22 cooperating by each engaging a portion of the top surface 13 of the bow portion 11 to assist in securing and maintaining the securement of the adapter main body 16 to the bow portion 11 of the bow-type shackle 10 wherein the adapter main body 16 enabling the bow-type shackle 10, when use with a synthetic sling, to retain the 5 to 1 design factor and up to a 5-degree offset in a straight-line pull compared to the use of the bow-type shackle alone 10.

FIG. 7 is an end view showing an alternative embodiment of a shack adapter 23 which has similar components to the shackle adapter 16 shown in FIGS. 2-6. However, unlike shackle adapter 16, shack adapter 23 includes a first arm 24 having a retaining member with a tapered outer surface 25a and a second arm 26 having a retaining member 27 with a tapered outer surface 27a with the tapered outer surfaces 25a, 27a functioning to promote attachment of an adapter main body 28 to the bow portion 11 of the bow-type shackle 10 in a snap-fit manner.

The first and second arms 24 and 26 of the shack adapter 23 each also includes a curved inner surface 24a, 26a with the curved inner surface 24a, 26a engageable with a corresponding curved side of the bow portion 11 of the bow-type shackle 10 to increase surface area contact between the shack adapter 23 and the bow-type shackle 10 to reduce potential wiggle or movement of the shack adapter 23 with respect to the bow-type shackle 10.

I claim:

1. A shackle adapter comprising:
   an adapter main body having a first side, a second side, and a curved support surface engageable to a curved surface of an inner arc contour of a bow portion of a bow-type shackle, the curved support surface conforming to the curved surface of the inner arc contour of the bow portion of the bow-type shackle;
   a first arm located proximal the first side of the main body and extending from the main body in a direction parallel to the first side and the second side of the main body, the first arm having an inner surface engageable with a first side of the bow portion of the bow-type shackle;
   a second arm located proximal the second side of the main body and extending from the main body in the direction parallel to the first side and the second side of the main body, the second arm having an inner surface engageable with a second side of the bow portion of the the bow-type shackle; and
   a first retaining member located on the inner surface proximal a free end of the first arm and a corresponding second retaining member located on the inner surface proximal a free end of the second arm, the first retaining member and the second retaining members cooperating by each engaging an outer surface of the bow portion to assist in securing the adapter main body to the bow portion of the bow-type shackle.

2. The shackle adapter of claim 1 wherein the first arm and the second arm each extends from the curved surface of the main body in the direction parallel to the first side and the second side of the main body.

3. The shackle adapter of claim 1 wherein the first arm extends from the first side of the main body in the direction parallel to the first side and the second side of the main body and the second arm extends from the second side of the main body in the direction parallel to the sides first side and the second side of the main body.

4. The shackle adapter of claim 1 wherein the first and second arms are made from a semi-rigid material to enable their flexing for attachment to the bow portion of the bow-type shackle.

5. The shackle adapter of claim 1 wherein the retaining members of the first arm and the second retaining member of the second arm each include a tapered surface to promote attachment of the adapter main body to the bow portion of the bow-type shackle in a snap-fit manner.

6. The shackle adapter of claim 1 wherein the adapter main body is made from a hardened rubber or plastic.

7. The shackle adapter of claim 1 wherein the inner surface of the first arm and the inner surface of the second arm each comprise a curved inner surface engageable with a corresponding curved side of the bow portion of the bow-type shackle.

8. A shackle adapter comprising:
an adapter main body made from a hardened rubber or plastic, the adapter main body having a first side, a second side, and a curved support surface engageable to a curved surface of an inner arc contour of a bow portion of a bow-type shackle, the curved support surface conforming to the curved surface of the inner arc contour of the bow portion of the bow-type shackle;
a first arm located proximal the first side of the main body and extending from the main body in a direction parallel to the first side and the second side of the main body, the first arm having an inner surface engageable with a first side of the bow portion of the bow-type shackle;
a second arm located proximal the second side of the main body and extending from the main body in the direction parallel to the first side and the second side of the main body, the second arm having an inner surface engageable with a second side of the bow portion of the bow-type shackle, the first arm and the second arm each providing an outward flexing action for attachment to the bow portion of the bow-type shackle;
a first retaining member located on the inner surface proximal a free end of the first arm and a corresponding second retaining member located on the inner surface proximal a free end of the second arm, the first retaining member and the second retaining member cooperating by each engaging an outer surface of the bow portion to assist in securing the adapter main body to the bow portion of the bow-type shackle.

9. The shackle adapter of claim 8 wherein the first retaining member of the first arm and the second retaining member of the second arm each include a tapered surface to promote attachment of the adapter main body to the bow portion of the bow-type shackle in a snap-fit manner.

10. The shackle adapter of claim 9 wherein the inner surface of the first arm and the inner surface of the second arm each comprise a curved inner surface engageable with a corresponding curved side of the bow portion of the bow-type shackle.

11. The shackle adapter of claim 10 wherein the first arm and the second arm each extends from the curved surface of the main body in the direction parallel to the first side and the second side of the main body.

12. The shackle adapter of claim 10 wherein the first arm extends from the first side of the main body in the direction parallel to the first side and the second side of the main body and the second arm extends from the second side of the main body in the direction parallel to the first side and the second side of the main body.

13. A shackle adapter comprising:
an adapter main body made from a hardened rubber or plastic, the adapter main body having a first side, a second side, and a curved support surface engageable to a curved surface of an inner arc contour of a bow portion of a bow-type shackle, the curved support surface conforming to the curved surface of the inner arc contour of the bow portion of the bow-type shackle;
a first arm located proximal the first side of the main body and extending from the main body in a direction parallel to the first side and the second side of the main body, the first arm having a curved inner surface engageable with a curved first side of the bow portion of the bow-type shackle;
a second arm located proximal the second side of the main body and extending from the main body in the direction parallel to the first side and the second side of the main body, the second arm having a curved inner surface engageable with a curved second side of the bow portion of the bow-type shackle, the first arm and the second arm each providing an outward flexing action for attachment to the bow portion of the bow-type shackle;
a first retaining member located on the inner surface proximal a free end of the first arm and a corresponding second retaining member located on the inner surface proximal a free end of the second arm, the retaining members cooperating by each engaging an outer surface of the bow portion to assist in securing the adapter main body to the bow portion of the bow-type shackle, the first retaining and the second retaining member each having a tapered surface to promote attachment of the adapter main body to the bow portion of the bow-type shackle in a snap-fit manner.

14. The shackle adapter of claim 13 wherein the first arm and the second arm each extends from the curved surface of the main body in the direction parallel to the first side and the second side of the main body.

15. The shackle adapter of claim 13 wherein the first arm extends from the first side of the main body in the direction parallel to the first side and the second side of the main body and the second arm extends from the second side of the main body in the direction parallel to the first side and the second side of the main body.

\* \* \* \* \*